US007365125B2

(12) United States Patent
Govaerts et al.

(10) Patent No.: US 7,365,125 B2
(45) Date of Patent: Apr. 29, 2008

(54) POLYCARBONATE COMPOSITIONS, ARTICLES, AND METHOD OF MANUFACTURE

(75) Inventors: Luc Govaerts, Hoogstraten (BE); Wim Steendam, Bergen op Zoom (NL); Rob Venderbosch, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 10/918,934

(22) Filed: Aug. 16, 2004

(65) Prior Publication Data
US 2006/0036035 A1 Feb. 16, 2006

(51) Int. Cl.
C08L 69/00 (2006.01)

(52) U.S. Cl. ............... 525/67; 525/92 E; 525/101; 525/133; 525/148; 525/464

(58) Field of Classification Search .............. None
See application file for complete search history.

(56) References Cited

U.S. PATENT DOCUMENTS

| 3,511,895 | A | | 5/1970 | Kydonieus et al. |
| 3,635,895 | A | | 1/1972 | Kramer et al. ......... 260/47 XA |
| 3,686,355 | A | | 8/1972 | Gaines, Jr. et al. ..... 260/824 R |
| 3,981,944 | A | | 9/1976 | Okamoto et al. |
| 3,988,389 | A | | 10/1976 | Margotte et al. |
| 4,217,438 | A | | 8/1980 | Brunelle et al. ............ 528/202 |
| 4,238,597 | A | | 12/1980 | Markezich et al. |
| 4,305,856 | A | | 12/1981 | Sakano et al. ....... 260/29.1 SB |
| 4,357,271 | A | | 11/1982 | Rosenquist |
| 4,390,657 | A | | 6/1983 | Liu |
| 4,478,981 | A | | 10/1984 | Arkles |
| 4,487,896 | A | | 12/1984 | Mark et al. |
| 4,550,139 | A | | 10/1985 | Arkles |
| 4,555,384 | A | | 11/1985 | Morris et al. ............... 422/109 |
| 4,600,632 | A | | 7/1986 | Paul et al. |
| 4,654,400 | A | | 3/1987 | Lohmeijer et al. ............ 525/64 |
| 4,746,701 | A | | 5/1988 | Kress et al. |
| 4,777,212 | A | | 10/1988 | Kress et al. ................. 525/67 |
| 4,782,115 | A | | 11/1988 | Paul et al. .................... 525/67 |
| 4,788,252 | A | | 11/1988 | de Boer et al. |
| 4,826,918 | A | | 5/1989 | Kress et al. |
| 4,927,880 | A | | 5/1990 | De Rudder et al. |
| 4,997,883 | A | | 3/1991 | Fischer et al. |
| 5,023,297 | A | | 6/1991 | Boutni |
| 5,109,076 | A | | 4/1992 | Freitag et al. |
| 5,116,905 | A | * | 5/1992 | Belfoure et al. .............. 525/67 |
| 5,126,428 | A | | 6/1992 | Freitag et al. ............... 528/196 |
| 5,128,409 | A | | 7/1992 | Gaggar |
| 5,266,618 | A | | 11/1993 | Watanabe et al. ........... 524/405 |
| 5,322,882 | A | | 6/1994 | Okamoto |
| 5,380,795 | A | | 1/1995 | Gosens et al. |
| 5,384,353 | A | * | 1/1995 | Gemmell et al. ............ 524/494 |
| 5,391,603 | A | | 2/1995 | Wessel et al. |
| 5,414,045 | A | | 5/1995 | Sue et al. |
| 5,451,632 | A | | 9/1995 | Okumura et al. |
| 5,455,310 | A | | 10/1995 | Hoover et al. .............. 525/431 |
| 5,488,086 | A | | 1/1996 | Umeda et al. |
| 5,530,083 | A | | 6/1996 | Phelps et al. ................. 528/25 |
| 5,602,201 | A | | 2/1997 | Fujiguchi et al. ............. 525/67 |
| 5,608,026 | A | | 3/1997 | Hoover et al. |
| 5,616,674 | A | | 4/1997 | Michel et al. |
| 5,714,537 | A | | 2/1998 | Laughner et al. ............ 524/445 |
| 5,723,541 | A | | 3/1998 | Ingenito et al. |
| 6,001,929 | A | | 12/1999 | Nodera et al. |
| 6,072,011 | A | | 6/2000 | Hoover |
| 6,252,013 | B1 | | 6/2001 | Banach et al. .............. 525/464 |
| 6,306,507 | B1 | | 10/2001 | Brunelle et al. ......... 428/423.7 |
| 6,545,089 | B1 | | 4/2003 | DeRudder et al. ............ 525/63 |
| 6,559,270 | B1 | | 5/2003 | Siclovan et al. |
| 6,576,706 | B1 | | 6/2003 | Nodera et al. |
| 6,613,820 | B2 | | 9/2003 | Fujiguchi et al. ........... 524/109 |
| 6,657,018 | B1 | | 12/2003 | Hoover ....................... 525/464 |
| 6,727,319 | B2 | | 4/2004 | Eichenauer ................... 525/66 |

(Continued)

FOREIGN PATENT DOCUMENTS

DE 40 16 417 A1 11/1991

(Continued)

OTHER PUBLICATIONS

Okamoto, M. "Relationship between the Composition of Polycarbonate Copolymers and the Refractive Index" Journal of Applied Polymer Science, vol. 84, 514-521 (2002).

(Continued)

Primary Examiner—David J. Buttner

(57) ABSTRACT

A thermoplastic composition, comprising: about 10 to about 84 wt. % of a polycarbonate resin; about 0.5 to about 40 wt. % of a polycarbonate-polysiloxane copolymer; 1 to about 40 wt. % of an impact modifier composition; and about 1 to about 50 wt. % of an alkyl (meth)acrylate polymer; each based on the total combined weight of the thermoplastic composition, exclusive of any filler. In another embodiment, the thermoplastic composition may comprise about 10 to about 85 wt. % of a polycarbonate resin; about 1 to about 40 wt. % of an impact modifier composition; and about 1 to about 50 wt. % of an impact-modified alkyl (meth)acrylate polymer; each based on the total combined weight of the thermoplastic composition, exclusive of any filler. The compositions have improved weld line strength, and are useful in the manufacture of molded parts, especially for electronic devices.

21 Claims, No Drawings

U.S. PATENT DOCUMENTS

| | | |
|---|---|---|
| 2003/0092837 A1 | 5/2003 | Eichenauer |
| 2003/0105226 A1 | 6/2003 | Cella et al. |
| 2003/0119986 A1 | 6/2003 | Eichenauer |
| 2003/0139504 A1 | 7/2003 | Miebach et al. ............ 524/261 |
| 2003/0191245 A1 | 10/2003 | Nodera et al. |
| 2003/0216510 A1 | 11/2003 | Wanat et al. |
| 2004/0011999 A1 | 1/2004 | Murray |
| 2004/0039091 A1 | 2/2004 | Eckel et al. ................ 524/121 |
| 2004/0039145 A1 | 2/2004 | Silva et al. ................... 528/25 |
| 2004/0220330 A1 | 11/2004 | DeRudder et al. .......... 524/837 |
| 2006/0014919 A9 | 1/2006 | Venderbosch et al. |

FOREIGN PATENT DOCUMENTS

| | | |
|---|---|---|
| EP | 0 186 917 A2 | 10/1985 |
| EP | 0 206 006 A1 | 12/1986 |
| EP | 0 247 430 B1 | 12/1987 |
| EP | 0 248 308 A2 | 12/1987 |
| EP | 0 254 054 B1 | 1/1988 |
| EP | 0 376 052 B1 | 7/1990 |
| EP | 0 387 570 B1 | 9/1990 |
| EP | 0 434 848 B1 | 7/1991 |
| EP | 0 517 927 B1 | 12/1992 |
| EP | 0 522 753 A2 | 1/1993 |
| EP | 0 524 731 B1 | 1/1993 |
| EP | 0 600 196 B1 | 10/1993 |
| EP | 0 635 547 A2 | 1/1995 |
| EP | 0 645 422 A1 | 3/1995 |
| EP | 0 707 045 A2 | 10/1995 |
| EP | 0 781 808 B1 | 7/1997 |
| EP | 1 162 235 B1 | 12/1999 |
| EP | 1 350 812 A2 | 3/2003 |
| EP | 1331246 | 7/2003 |
| GB | 1 182 807 | 3/1970 |
| WO | WO80/00084 | 1/1980 |
| WO | WO86/00083 | 1/1986 |
| WO | WO 01/72905 A2 | 10/2001 |
| WO | WO 03/025060 A1 | 3/2003 |
| WO | WO 03/025061 A2 | 3/2003 |
| WO | WO 2004/076541 A2 | 9/2004 |
| WO | WO 2005/037921 A1 | 4/2005 |
| WO | 2005061621 | 7/2005 |
| WO | 2005066276 | 7/2005 |
| WO | WO 2005/075549 A1 | 8/2005 |

OTHER PUBLICATIONS

DE 40 16 417 A1; Publication Date Nov. 28, 1991 (translation of abstract only).
EP 0 247 430; Publication Date Dec. 2, 1987 (translation of abstract only).
EP 0 248 308; Publication Date Dec. 9, 1987 (translation of abstract only).
EP 0 387 570 B1; Publication Date Sep. 19, 1990 (translation of abstract only).
JP 04-225062; Publication Date Aug. 14, 1992 (translation of abstract only).
JP 07-196873; Publication Date Aug. 1, 1995 (translation of abstract only).
JP 08-269314; Publication Date Aug. 1, 1996 (translation of abstract only).
JP 08-309934; Publication Date Nov. 26, 1996 (translation of abstract only).
JP 11-035831; Publication Date Feb. 9, 1999 (translation of abstract only).
European Search Report for European Application No. EP 05 25 5053; dated Nov. 28, 2005.
EP 0707045 A2. "flame reistant thermoplastic polycarbonate moulding compositions". Publication date Apr. 17, 1996, (Abstract Only).
European Search Report for EP 05 25 4891, Mailed Nov. 15, 2005.
JP58011540. "Thermoplastic Resin Composition". Publication Date: Jan. 22, 1983, (Abstract Only).
JP06322545A2. "Planted Resin Product". Publication Date: Nov. 22, 1994, (Abstract Only).
JP07082467. "Impact-Resistant Resin Composition". Publication Date Sep. 16, 1993, (Abstract Only).
International Search Report for International Application No. PCT/US2005/035432 mailed Mar. 2, 2006.
International Search Report for International Application No. PCT/US2006-007372, mailed Jul. 19, 2006, 6 pages.

\* cited by examiner

POLYCARBONATE COMPOSITIONS, ARTICLES, AND METHOD OF MANUFACTURE

BACKGROUND OF THE INVENTION

This disclosure relates to polycarbonate compositions, methods of manufacture, and uses thereof to form articles.

Polycarbonates compositions are useful in the manufacture of articles and components for a wide range of applications, from automotive parts to electronic appliances. Despite their many advantages, one property that has proven difficult to achieve in some polycarbonate compositions is weld line strength. In the molding of parts from thermoplastic materials, it is common to use a mold design in which molten plastic flowing in one direction meets molten plastic flowing from another direction as the mold fills. Where the two masses meet, the streams fuse together and form a bond at the juncture. The zone where the materials join is often referred to in the industry as the weld line or knit line. The strength and impact of a molded part at the weld line is usually lower than in other sections of the part. This problem is exacerbated when the part is complex, such as those processed in a mold in which several weld lines are formed in the same part. Reduced weld line strength imposes severe limitations on the design of parts. In many cases the dimensions of the entire part are controlled by the weld line strength, and the need to have a safety factor to compensate for weakness in this area can force the designer to make parts larger than necessary, or to substitute a higher performance (and more expensive) polymer than would otherwise be needed.

A variety of approaches have been used in a attempt to improve weld line strength in polycarbonate compositions, particularly compositions comprising impact modifiers such as acrylonitrile-butadiene-styrene (ABS). U.S. Pat. No. 3,988,389 to Margotte et al. discloses that the weld line strength of a polycarbonate/ABS blend improved with use of a specific graft ABS formulation having a narrowly defined graft ratio, rubber particle size, rubber content, and the like. British Patent 1,182,807 describes a blend of a thermoplastic polycarbonate and a poly(methylmethacrylate) that optionally includes a minor proportion of a "rubbery polymeric material" such as styrene-butadiene rubber (SBR), nitrile rubbers, and graft polymers, primarily rubbery acrylate copolymers. U.S. Pat. No. 5,128,409 to Gaggar discloses that improve weld line strength is achieved using a combination of polycarbonate, a high rubber graft ABS, and up to about 20 wt. % of a poly(methyl methacrylate).

While suitable for their intended purposes, there nonetheless remains a continuing need for polycarbonate compositions with even more improved weld line strength, particularly compositions having improved weld line strength together with good impact strength, softening temperature, and/or good flow properties.

SUMMARY OF THE INVENTION

The above-described and other deficiencies of the art are met by a thermoplastic composition comprising about 10 to about 84 weight percent (wt. %) of a polycarbonate resin; about 0.5 to about 40 wt. % of a polycarbonate-polysiloxane copolymer; about 1 to about 50 wt. % of an alkyl (meth) acrylate polymer; and about 1 to about 40 wt. % of an impact modifier composition, each based on the total combined weight of thermoplastic composition, exclusive of any filler.

In another embodiment, a method of manufacture comprises combining the above-described components to form a thermoplastic composition.

In yet another embodiment, an article comprises the above-described thermoplastic composition.

In still another embodiment, a method of manufacture of an article comprises molding, extruding, or shaping the above-described thermoplastic composition into an article.

In another embodiment, the above-described and other deficiencies of the art are met by a thermoplastic composition comprising about 10 to about 85 wt. % of a polycarbonate resin; about 1 to about 40 wt. % of an impact modifier composition; and about 1 to about 50 wt. % of an impact-modified alkyl (meth)acrylate polymer, each based on the total combined weight of thermoplastic composition, exclusive of any filler.

In another embodiment, a method of manufacture comprises combining the above-described components to form a thermoplastic composition.

In yet another embodiment, an article comprises the above-described thermoplastic composition.

In still another embodiment, a method of manufacture of an article comprises molding, extruding, or shaping the above-described thermoplastic composition into an article.

DETAILED DESCRIPTION OF THE INVENTION

Without being bound by theory, it is believed that the favorable results obtained herein, i.e., thermoplastic compositions having practically improved impact and strength, in particular weld line impact and strength, together with a desirable balance of flow and heat properties, may be achieved by use of a combination of a polycarbonate resin, a polycarbonate-polysiloxane copolymer, an impact modifier; and a poly(alkyl (meth)acrylate. It has also been unexpectedly found that the above properties may be achieved by use of a combination of a polycarbonate resin, an impact modifier; and an impact-modified poly(alkyl (meth)acrylate. The combination of a polycarbonate resin, a polycarbonate-polysiloxane copolymer, an impact modifier; and an impact-modified poly(alkyl (meth)acrylate provides very good results.

As used herein, the terms "polycarbonate" and "polycarbonate resin" means compositions having repeating structural carbonate units of the formula (1):

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula $HO—R^1—OH$, which includes dihydroxy compounds of formula (3)

$$HO—A^1—Y^1—A^2—OH \quad (3)$$

wherein $Y^1$, $A^1$ and $A^2$ are as described above. Also included are bisphenol compounds of general formula (4):

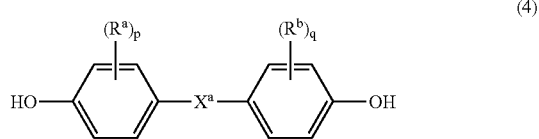

wherein $R^a$ and $R^b$ each represent a halogen atom or a monovalent hydrocarbon group and may be the same or different; p and q are each independently integers of 0 to 4; and $X^a$ represents one of the groups of formula (5):

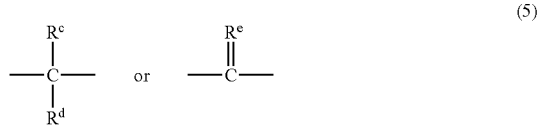

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05-2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

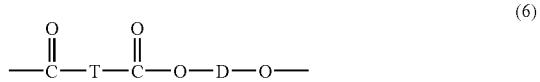

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per gram (dl/gm), specifically about 0.45 to about 1.0 dl/gm. The polycarbonates may have a weight average molecular weight (MW) of about 10,000 to about 200,000, specifically about 20,000 to about 100,000 as measured by gel permeation chromatography.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300° C./1.2 kg, of about 4 to about 28 grams per centimeter cubed (g/cm$^3$), specifically about 18 to about 26 g/cm$^3$. Mixtures of polycarbonates of different flow properties may be used to achieve the overall desired flow property.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $CT$, $Br^-$, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

The copolyester-polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In one embodiment, poly(alkylene terephthalate)s is used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 1 to about 99 wt. % polycarbonate and correspondingly about 99 to about 1 wt. % polyester, in particular a poly(alkylene terephthalate). In one embodiment, the blend comprises about 30 to about 70 wt. % polycarbonate and correspondingly about 70 to about 30 wt. % polyester. The foregoing amounts are base on the total weight of the polycarbonate resin and polyester resin.

The thermoplastic composition may further comprise a polycarbonate-polysiloxane copolymer comprising polycarbonate blocks and polydiorganosiloxane blocks. Although this component comprises polycarbonate blocks, it is not to be considered a part of the polycarbonate resin component as described above, but rather as a separate and additional component.

The polycarbonate blocks comprise repeating structural units of formula (1) as described above, and preferably wherein $R^1$ is of formula (2) as described above. These units may be derived from reaction of dihydroxy compounds of formula (3) as described above. In one embodiment, the dihydroxy compound is bisphenol A, in which each of A1 and A2 is p-phenylene and Y1 is isopropylidene.

The polydiorganosiloxane blocks comprise repeating structural units of formula (8):

(8)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

D in formula (8) is selected so as to provide the desired properties to the thermoplastic composition. The value of D will therefore vary depending on the type and relative amount of each component in the thermoplastic composition, including the type and amount of polycarbonate, polysiloxane-polycarbonate copolymer, poly(alkyl (meth)acrylate, impact modifier, and other additives. Suitable values for D may be determined by one of ordinary skill in the art without undue experimentation using the guidelines taught herein. Generally, D has an average value of 2 to about 1000, specifically about 10 to about 100, more specifically about 25 to about 80, even more specifically about 40 to about 70. In one embodiment, D has an average value of about 30 to about 60, and in still another embodiment, D has an average value of about 50. Where D is of a lower value, e.g., less than about 40, it may be necessary to use a relatively larger amount of the polysiloxane-polycarbonate copolymer. Conversely, where D is of a higher value, e.g., greater than about 40, it may be necessary to use a relatively smaller amount of the polysiloxane-polycarbonate copolymer.

In one embodiment the polydiorganosiloxane blocks comprise repeating structural units of formula (9)

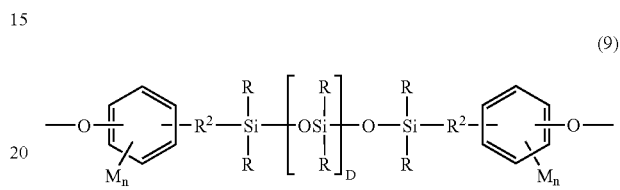

(9)

wherein R and D are as defined above. $R^2$ in formula (9) is a divalent $C_2$-$C_8$ aliphatic group. Each M in formula (9) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, R2 is a divalent C1-C3 aliphatic group, and R is methyl.

These units may be derived from the corresponding dihydroxy polydiorganosiloxane (10):

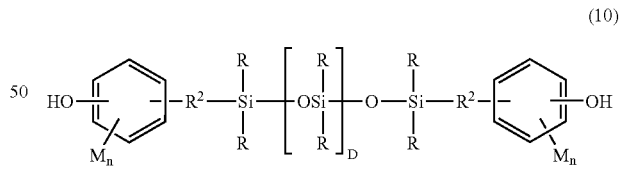

(10)

wherein R, D, M, $R^2$, and n are as described above.

Such dihydroxy polysiloxanes can be made by effecting a platinum catalyzed addition between a siloxane hydride of the formula (11),

(11)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate copolymer may be manufactured by reaction of dihydroxy polysiloxane (10) with a carbonate source and a dihydroxy aromatic compound of formula (3), optionally in the presence of a phase transfer catalyst as described above. Suitable conditions are similar to those useful in forming polycarbonates. Preferably, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above.

In the production of the polysiloxane-polycarbonate copolymer, the amount of dihydroxy polydiorganosiloxane is selected so as to provide the desired properties to the copolymer, and thus to the compositions. The amount of dihydroxy polydiorganosiloxane will therefore vary depending on desired level of flame retardancy, the value of D, and the type and relative amount of each component in the thermoplastic composition, including the type and amount of polycarbonate, type and amount of any impact modifier, type and amount of polysiloxane-polycarbonate copolymer, and type and amount of poly(alkyl)methacrylates. Suitable amounts of dihydroxy polydiorganosiloxane can be determined by one of ordinary skill in the art without undue experimentation using the guidelines taught herein. Typically, the amount of dihydroxy polydiorganosiloxane is selected so as to produce a copolymer comprising about 8 to about 40 wt. % of polydimethylsiloxane, or an equivalent molar amount of another polydiorganosiloxane. The amount of dihydroxy polydiorganosiloxane may further be selected so as to produce a copolymer comprising about 15 to about 30 wt. % of polydimethylsiloxane, specifically about 15 to about 25 wt. %, or an equivalent molar amount of another polydiorganosiloxane. The amount of dimethylsiloxane units in the polysiloxane-polycarbonate copolymer may be determined by those of ordinary skill in the art using known methods. For example, the weight percent of dimethylsiloxane units in a compound of formula (10) may be determined by comparison of the integrated intensity of the aromatic protons to the protons on the siloxane chains in the $^1$H NMR spectra of a homogenous sample dissolved in $CDCl_3$ (without tetramethylsilane).

In one embodiment, the amount of dihydroxy polydiorganosiloxane is selected so as to produce a copolymer comprising about 0.1 to about 30 mole percent of polydiorganosiloxane blocks relative to the moles of polycarbonate blocks, more specifically about 0.5 to about 20 mol percent, and even more specifically, about 0.5 to about 12 mole percent of polydiorganosiloxane blocks relative to the moles of polycarbonate blocks. Such polysiloxane-polycarbonate copolymers may be opaque or transparent. Suitable polysiloxane-polycarbonate copolymers are commercially available from GE Plastics.

The polysiloxane-polycarbonate copolymers may have a weight-average molecular weight (measured, for example, by gel permeation chromatography, ultra-centrifugation, or light scattering) of about 10,000 to about 200,000, preferably about 20,000 to about 100,000.

The thermoplastic compositions further include an impact modifier composition. Suitable impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers.

Preferably, conjugated diene monomers are used for preparing the elastomer phase, and are of formula (12):

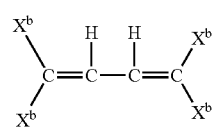

(12)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (13):

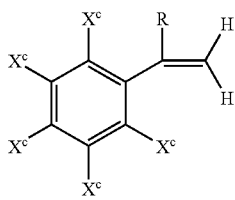

(13)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (14):

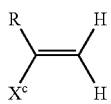

(14)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. However, it is preferred that the amount of Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-9}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-9}$ alkyl (meth)acrylate monomers may optionally be polymerized in admixture with up to 15 wt. % of comonomers of formulas (12), (13), or (14). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 30 to about 95 wt. % of the total graft copolymer, more specifically about 40 to about 90 wt. %, and even more specifically about 50 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (13) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers.

Suitable comonomers include, for example, the above-described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, ethyl (meth)acrylate, n-propyl (meth)acrylate, isopropyl (meth)acrylate, and the like, and combinations comprising at least one of the foregoing comonomers. In one embodiment, acrylonitrile is used as the comonomer. In another embodiment, the rigid phase is essentially free of methyl methacrylate, i.e., the monomers used to form the rigid grafting phase contains less than about 5 weight percent methyl methacrylate.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 90 wt. % of monovinyl aromatic monomer, specifically about 10 to about 80 wt. %, more specifically about 20 to about 70 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier composition comprises structural units derived from: at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy) methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

The thermoplastic composition further comprises a poly (alkyl (meth)acrylate), wherein the alkyl group is straight or branched-chain, and has 1 or 2 carbons atoms. In one embodiment the poly(alkyl (meth)acrylate) is poly(methyl methacrylate) (PMMA). PMMA may be produced by the polymerization of methyl methacrylate monomer, and may be derived by (1) the reaction of acetone cyanohydrin, methanol, and sulphuric acid or (2) the oxidation of tert-butyl alcohol to methacrolein and then to methacrylic acid followed by the esterification reaction with methanol. As is known, PMMA homopolymer is difficult to obtain, and therefore is available commercially and used herein as a mixture of the homopolymer and various copolymers of methyl methacrylate and $C_1$-$C_4$ alkyl acrylates, such as ethyl acrylate. "PMMA" as used herein therefore includes such mixtures, which are commercially available from, for example, Atofina under the trade designations V825, V826, V920, V045, and VM, and from Lucite under the trade names CLG340, CLG356, CLG960, CLG902, CMG302.

In one embodiment, the poly(alkyl (meth)acrylate) is an impact-modified poly(alkyl (meth)acrylate), for example an impact-modified poly(methyl methacrylate). Impact-modified poly(alkyl (meth)acrylate)s have improved impact strength relative to poly(alkyl (meth)acrylate)s. Suitable impact-modified poly(alkyl (meth)acrylate)s have improved impact strength. For example, the impact-modified poly (alkyl (meth)acrylate)s have a notched Izod of greater than about 20 J/m, specifically greater than about 25 J/m, more specifically greater than about 30 J/m, even more specifically greater than about 38 J/m, measured in accordance with ASTM D-256 at room temperature.

A variety of methods may be used to increase the impact strength of the poly(alkyl (meth)acrylate). One useful method is to incorporate an effective amount of a co-polymerizable non-alkyl (meth)acrylate) component. Suitable non-alkyl (meth)acrylate) components include monovinylaromatic monomers containing condensed aromatic ring structures, such as vinyl naphthalene, vinyl anthracene and the like, or monomers of formula (13) above; as well as monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and non-alkyl (meth) acrylate) monomers of the generic formula (14) above. Specific suitable monomers of formula (13) include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and specific non-alkyl (meth)acrylate) monomers of the generic formula (14) include acrylonitrile, ethacrylonitrile, methacrylonitrile, alpha-chloroacrylonitrile, beta-chloroacrylonitrile, alpha-bromoacrylonitrile, and the like, and combinations comprising at least one of the foregoing compounds. Styrene and/or alpha-methylstyrene may be used.

Another method that may be useful to increase the impact strength of the poly(alkyl (meth)acrylate) is to incorporate an effective amount of a co-polymerizable $C_3$-$C_8$ alkyl (meth)acrylate), i.e., an alkyl (meth) acrylate wherein the alkyl group has three to about eight carbon atoms. Exemplary $C_3$-$C_8$ alkyl (meth)acrylates include n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, and 2-ethylhexyl acrylate may be useful. Mixtures of the foregoing copolymerizable monovinylaromatic monomers, monovinyl monomers and $C_3$-$C_8$ alkyl (meth)acrylate), may also be used.

Effective amounts of the copolymerizable monovinylaromatic monomers, monovinylic monomers and/or $C_3$-$C_8$ alkyl (meth)acrylate)s is generally small, for example about 0.1 to about 5 mole percent of the total impact-modified poly(alkyl (meth)acrylate) compositions, specifically about 0.5 to about 2 mole percent of the total impact-modified poly(alkyl (meth)acrylate) compositions. The monovinylaromatic monomers, monovinylic monomers and/or $C_3$-$C_8$ alkyl (meth)acrylate)s may be copolymerized with the C1-C2 alkyl (meth)acrylate monomers used to form the poly(alkyl (meth)acrylate), or they may be separately polymerized and then combined with the poly(alkyl (meth)acrylate). Bulk or emulsion co-polymerization may be used.

Another method that may be useful to increase the impact strength of the poly(alkyl (meth)acrylate) is to incorporate an effective amount of an impact modifier component as described above, i.e., a component comprising an elastomeric component and a rigid phase. The impact modifier component may be covalently bound (e.g., grafted) or otherwise mixed, blended, or alloyed with the poly(alkyl (meth)acrylate) Alternatively, in another embodiment, the impact-modified poly(alkyl (meth)acrylate) may comprise a poly(alkyl (meth)acrylate) component covalently bound (e.g., grafted) or mixed, blended, or alloyed with a small amount of an elastomeric component having a Tg less than about 10° C., more specifically less than about −10° C., or more specifically about −40° to −80° C. Suitable elastomeric components are described above.

In either case, a suitable elastomeric component may be formed from monomers of formula (14), in particular (meth)acrylate monomers. The elastomer component may be cross-linked, particulate emulsion homopolymers or copolymers of $C_{1-9}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-9}$ alkyl (meth)acrylate monomers may optionally be polymerized in admixture with up to 15 wt. % of comonomers of formulas (12) or (13), or (14). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. A particular comonomer is styrene.

Suitable impact-modified poly(alkyl (meth)acrylate)s are commercially available, and include, for example, those available from Atofina under the trade names HFI, for example HFI-10, HFI-7 and HFI7G-100; V052i and VMi DR; and MI-7; and those available from Lucite under the trade names ST15G6, ST25G6, ST35G6, ST45G6, ST25G7.

The advantageous properties of the present compositions are due at least in part to the appropriate selection the relative amounts of each component, using the guidance provided herein.

In one embodiment, it has been found that use of a polycarbonate-polysiloxane copolymer can provide improved weld strength. These compositions may broadly comprise about 10 to about 84 wt. % polycarbonate, about 0.5 to about 40 wt. % polycarbonate-polysiloxane copolymer, about 1 to about 40 wt. % impact modifier, and about 1 to about 50 wt. % poly(alkyl (meth)acrylate), which may be impact-modified poly(alkyl (meth)acrylate).

In another embodiment the compositions may comprise about 30 to about 80 wt. % polycarbonate, about 2 to about 35 wt. % polycarbonate-polysiloxane copolymer, about 2.5 to about 35 wt. % impact modifier, and about 5 to about 35 wt. % poly(alkyl (meth)acrylate), which may be impact-modified poly(alkyl (meth)acrylate).

In still another embodiment, the compositions comprise about 45 to about 75 wt. % polycarbonate, about 2.5 to about 30 wt. %, more specifically about 1 to about 25 wt % polycarbonate-polysiloxane copolymer, about 5 to about 35 wt. %, more specifically about 5 to about 15 wt. % impact modifier, and about 10 to about 35 wt. %, more specifically about 15 to about 30 wt. % poly(alkyl (meth)acrylate), which may be impact-modified poly(alkyl (meth)acrylate).

It has also been found that use of an impact-modified poly(alkyl (meth)acrylate) can provide improved weld line strength. These compositions may broadly comprise about 10 to about 85 wt. % polycarbonate, about 1 to about 40 wt. % impact modifier, and about 1 to about 50 wt. % impact-modified poly(alkyl (meth)acrylate).

In another embodiment, these compositions may broadly about 20 to about 80 wt. % polycarbonate, about 2.5 to about 35 wt. % impact modifier, and about 5 to about 35 wt. % impact-modified poly(alkyl (meth)acrylate).

Alternatively, these compositions may broadly about 30 to about 75 wt. % polycarbonate, about 5 to about 35 wt. % impact modifier, and about 10 to about 35 wt. % impact-modified poly(alkyl (meth)acrylate). Still more specifically, these compositions may comprise about 45 to about 75 wt. % polycarbonate, about 5 to about 15 wt. % impact modifier, and about 15 to about 30 wt. % impact-modified poly(alkyl (meth)acrylate).

The thermoplastic composition may further include various additives ordinarily incorporated in resin compositions of this type, with the proviso that the additives are preferably selected so as to not significantly adversely affect the desired properties of the thermoplastic composition. In one embodiment, the additive(s) may be treated to prevent or substantially reduce any degradative activity. Such treatments may include coating with a substantially inert substance such as silicone, acrylic, or epoxy resins. Treatment may also comprise chemical passivation to remove, block, or neutralize catalytic sites. A combination of treatments may be used. Additives such as fillers, reinforcing agents, and pigments may be treated. Mixtures of additives may be used. Such additives may be mixed at a suitable time during the mixing of the components for forming the composition.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to about 50 parts by weight, based on 100 parts by weight of the thermoplastic composition.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, specifically about 0.1 to about 0.5 parts by weight based on 100 parts by weight of the thermoplastic composition, excluding any filler.

Suitable heat and color stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat and color stabilizers are generally used in amounts of about 0.01 to about 5 parts by weight, specifically about 0.05 to about 0.3 parts by weight based on 100 parts by weight of the thermoplastic composition, excluding any filler.

Suitable secondary heat stabilizer additives include, for example thioethers and thioesters such as pentaerythritol tetrakis (3-(dodecylthio)propionate), pentaerythritol tetrakis [3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of parts by weight of the polycarbonate component and the impact modifier composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, specifically about 0.1 to about 1 based on 100 parts by weight of the thermoplastic composition, excluding any filler.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5.0 parts by weight, based on 100 parts by weight of the thermoplastic composition, excluding any filler.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, specifically about 1 to about 10 parts by weight based on 100 parts by weight of the thermoplastic composition, excluding any filler.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the thermoplastic composition, excluding any filler.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the thermoplastic composition, excluding any filler.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5, 3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.01 to about 10 parts by weight, based on 100 parts by weight of the thermoplastic composition, excluding any filler.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 0.5 to about 20 parts by weight, based on 100 parts by weight of the thermoplastic composition, excluding any filler.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

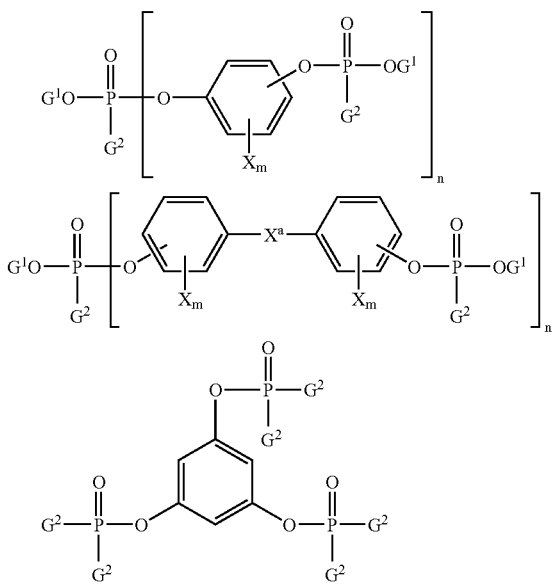

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis (diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, and tris (aziridinyl) phosphine oxide. When present, phosphorus-containing flame retardants are generally present in amounts of about 1 to about 20 parts by weight, based on 100 parts by weight of polycarbonate resin and any impact modifier.

Halogenated materials may also be used as flame retardants, for example halogenated compounds and resins of formula (15):

(15)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (15) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)- methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibrombenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 1 to about 50 parts by weight, based on 100 parts by weight of the thermoplastic composition, excluding any filler.

Inorganic flame retardants may also be used, for example salts of $C_{2-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example alkali metal and alkaline-earth metal salts such as $Na_2CO_3$, $K_2CO_3$, $MgCO_3$, $CaCO_3$, $BaCO_3$, $Li_3AlF_6$, $BaSiF_6$, $KBF_4$, $K_3AlF_6$, $KAlF_4$, $K_2SiF_6$, and/or $Na_3AlF_6$, or the like. When present, inorganic flame retardant salts are generally present in amounts of about 0.01 to about 25 parts by weight, more specifically about 0.1 to about 10 parts by weight, based on 100 parts by weight of the thermoplastic composition, excluding any filler.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of the thermoplastic composition, excluding any filler.

The thermoplastic compositions may be manufactured by methods generally available in the art, for example, in one embodiment powdered polycarbonate resin, polycarbonate-polysiloxane copolymer, impact modifier, poly(alkyl (meth) acrylate), and/or other optional components are first blended, optionally with chopped glass strands or other fillers in a Henschel high speed mixer. Other low shear processes, including but not limited to hand mixing, may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The thermoplastic compositions have excellent physical properties. In particular, the thermoplastic compositions have improved weld line strength. Weld line strength may be determined, for example, using bars molded in a double gated mold (thereby producing a weld line), and having a length of 170 millimeter (mm) (+10%), a width of 10 mm (+10%), and a thickness of 2 or 4 mm (+10%) as indicated.

Improved knit line strength may be reflected, for example, by improved tensile Charpy values of a sample having a weld line. The thermoplastic compositions may also have a tensile Charpy, measured on a 2 mm (±10%) bar molded in a double gated mold, of greater than about 100 $kJ/m^2$, specifically greater than about 105, more specifically greater than about 110, even more specifically greater than about 115, even more specifically greater than about 120 $kJ/m^2$, measured at room temperature in accordance with DIN 53448-B.

In a particularly unexpected feature, use of the present compositions results in a decrease in the change (delta) in tensile stress at yield for a sample having a weld line relative to a sample without a weld line. Thus, bars comprising the thermoplastic compositions, molded in a double gated mold and having a thickness of 2 mm (±10%) may have a delta tensile stress at yield of less than about 6 MPa, specifically less than about 5.5 MPa, relative to bars comprising the thermoplastic compositions, molded in a single gated mold, and having a thickness of 2 mm (±10%) bar, when determined in accordance with ISO 527 at room temperature. The thermoplastic compositions may also have delta tensile stress at yield of smaller than about 6 MPa, specifically smaller than about 4 MPa, measured on a 4 mm thick (+10%) bar molded in a double-gated mold vs. a single gated mold in accordance with ISO 527 at room temperature.

The thermoplastic compositions may also have a flexural strain at break of greater than about 3.5%, specifically greater than about 5.0%, measured on a 4 mm thick (+10%) bar molded in a double-gated mold in accordance with ISO 527 at room temperature.

The thermoplastic compositions may also have a tensile elongation at break of greater than about 3.8%, specifically greater than about 2.8, measured on a 4 mm thick (±10%) bar molded in a double-gated mold in accordance with ISO 527 at room temperature. The thermoplastic compositions may also have a tensile elongation at break of greater than about 2.5%, specifically greater than about 3.0%, more specifically greater than about 3.5%, measured on a 2 mm thick (+10%) bar molded in a double-gated mold in accordance with ISO 527 at room temperature.

The thermoplastic compositions may also have an Unnotched Izod Impact, measured on 4 mm thick (+10%) bars molded in a double gated mold, of greater than about 7 kJ/m2, specifically greater than about 8.5 kJ/m2, more specifically greater than about 9.5 kJ/m2, measured at room temperature in accordance with ISO 180/1A.

The impact strength of the thermoplastic compositions is also good at low temperatures. The thermoplastic compositions may have a Notched Izod Impact, measured on 4 mm thick (±10%) bars molded without a weld line, of greater than about 30 kJ/m$^2$, specifically greater than about 33 kJ/m$^2$, more specifically greater than about 40 kJ/m$^2$, measured at room temperature in accordance with ISO 180/1A. The thermoplastic compositions may have a Notched Izod Impact, measured on 4 mm thick (±10%) bars molded without a weld line, of greater than about 20 kJ/m$^2$, specifically greater than about 25 kJ/m$^2$, more specifically greater than about 28 kJ/m$^2$, measured at 0° C. in accordance with ISO 180/1A. The thermoplastic compositions may have a Notched Izod Impact, measured on 4 mm (±10%) bars molded without a weld line, of greater than about 15 kJ/m$^2$, specifically greater than about 17 kJ/m$^2$, measured at −30° C. in accordance with ISO 180/1A.

In addition, the thermoplastic compositions have excellent viscosity characteristics. For example, the thermoplastic compositions have a melt volume ratio (MVR) of about 10 to about 35, more specifically about 15 to about 30 cm$^3$/10 minutes, measured at 260° C./5 kg in accordance with ISO 1133.

The thermoplastic polycarbonate compositions may further have a Vicat B/120 of about 100 to about 140° C., more specifically about 110 to about 138° C., measured in accordance with ISO 306 at 120° C./5 kg.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

In an advantageous feature, the thermoplastic compositions can provide articles having improved weld line strength.

The polycarbonate compositions are is further illustrated by the following non-limiting examples, which are based on the following components.

TABLE 1

| Abbreviation | Component | Trade name (Source) |
|---|---|---|
| PC-1 | BPA polycarbonate resin made by a melt process with an MVR at 300° C./1.2 kg of about 26 g/10 min | GE Plastics |
| PC-2 | BPA polycarbonate resin made by a melt process with an MVR at 300° C./1.2 kg of about 6 g/10 min | GE Plastics |
| PC-PDMS | Polysiloxane-polycarbonate copolymer comprising units derived from BPA and units derived from formula (10), wherein n is 0, R$^2$ is propylene, R is methyl, D has an average value of about 50, the copolymer having an absolute weight average molecular weight of about 30000 g/mol, and a dimethylsiloxane content of about 20 wt. % | GE Plastics |
| ABS | High rubber graft emulsion polymerized ABS comprising about 11.1 wt. % acrylonitrile and about 38.5 wt. % styrene grafted to about 51 wt. % polybutadiene with a crosslink density of 43-55% | GE Plastics |
| PMMA-1 | Methyl methacrylate (MMA)-ethyl acrylate (EA) co-polymer, comprising about 95.6 mol % MMA and about 4.4 mol % EA | PMMA V920 from Atofina |
| PMMA-2 | Methyl methacrylate-ethyl acrylate (MMA-EA) co-polymer with an acrylic/styrene rubber, comprising about 90.8 mol % MMA, about 8.6 mol % EA, and about 0.6 mol % styrene | PMMA HFI-7 from Atofina |
| SAN | Styrene acrylonitrile comprising about 25 wt. % acrylonitrile and 75 wt. % styrene | GE Plastics |

The components shown in Table 2 (wt. %), and further including 0.1-0.5 wt. % of a mold release agent and 0.1 to 0.5 wt. % of a combination of an antioxidant and a light stabilizer were combined using a Werner & Pfleiderer co-rotating twin screw extruder (25 millimeter screw) using a melt temperature range of about 250 to about 300° C., and subsequently molded at a melt temperature range of about 250 to about 300° C. for impact and heat distortion temperature and double gated property testing on a Engel 100 ton injection molding machine. Results of testing, using the methods described above, are also shown in Table 2.

TABLE 2

| Formulations | Sample No. | | | | | | | | | | | | | | | |
|---|---|---|---|---|---|---|---|---|---|---|---|---|---|---|---|---|
| | 1* | 2* | 3 | 4* | 5 | 6 | 7* | 8* | 9 | 10 | 11 | 12 | 13 | 14 | 15 | 16 |
| PC | 57 | 57 | 57 | 49.5 | 49.5 | 49.5 | 70 | 70 | 62.5 | 67.5 | 57.5 | 45 | 54.5 | 44.5 | 32 | 54.5 |
| PMMA-1 (V920) | | 28 | | | 28 | | | 17 | 17 | 17 | 17 | 17 | 28 | 28 | 28 | 28 |
| PMMA-2 (HFI-7) | | | 28 | | | 28 | | | | | | | | | | |
| SAN | 28 | | | 28 | | | 17 | | | | | | | | | |
| ABS | 14 | 14 | 14 | 14 | 14 | 14 | 12 | 12 | 12 | 12 | 12 | 12 | 14 | 14 | 14 | |
| MBS | | | | | | | | | | | | | | | | 9 |
| PC-PDMS | | | | 7.5 | 7.5 | 7.5 | | | 7.5 | 2.5 | 12.5 | 25 | 2.5 | 12.5 | 25 | 7.5 |

TABLE 2-continued

| Formulations | 1* | 2* | 3 | 4* | 5 | 6 | 7* | 8* | 9 | 10 | 11 | 12 | 13 | 14 | 15 | 16 |
|---|---|---|---|---|---|---|---|---|---|---|---|---|---|---|---|---|
| Properties | | | | | | | | | | | | | | | | |
| MVR | 29.1 | 21.5 | 15.5 | 17.1 | 18.9 | 17.7 | 21.8 | 23.1 | 19.1 | 20.9 | 17.7 | 13.1 | 22.2 | 17.7 | 13.7 | 20.8 |
| Double gated bar, 2 mm Tensile Charpy, kJ/m$^2$ | 85.7 | 100.1 | 123.8 | 90.8 | 121.9 | 129.5 | 94.0 | 98.5 | 110.1 | 101.1 | 114.4 | 154.3 | 113.6 | 124.5 | 114.3 | 126.5 |
| Double gated bar, 2 mm Tensile Elongation, % | 1.8 | 3.4 | 3.9 | 2.2 | 3.6 | 3.9 | 2.3 | 3.6 | 3.9 | 3.6 | 4.0 | 3.6 | 3.1 | 3.0 | 3.0 | 5.5 |
| Double gated bar, 2 mm Tensile Stress at yield, Mpa | 40.9 | 53.9 | 49.6 | 44.2 | 49.6 | 43.8 | 43.8 | 53.8 | 51.1 | 51.5 | 50.7 | 47.5 | 50.4 | 47.7 | 46.1 | 57.0 |
| Single gated bar vs. double gated bar, 2 mm, Delta Tensile Stress at yield, Mpa | 16.1 | 3.4 | 1.9 | 7.7 | 3.6 | 3.4 | 13.2 | 3.8 | 3.2 | 3.9 | 2.7 | 4.6 | 4.1 | 4.9 | 5.0 | 0.4 |
| Double gated bar 4 mm Izod (Unnotched), kJ/m$^2$ | 5.9 | 8.9 | 11.6 | 6.4 | 9.9 | 12.0 | 2.8 | 8.7 | 14.7 | 9.8 | 16.4 | 24.7 | 8.9 | 12.3 | 13.4 | 15.8 |
| Double gated bar 4 mm Tensile Elongation, % | 1.9 | 4.2 | 4.2 | 2.3 | 4.1 | 3.8 | 2.4 | 5.9 | 5.8 | 5.9 | 5.4 | 4.4 | 4.2 | 4.0 | 3.8 | 5.5 |
| Double gated bar, 4 mm Tensile Stress at yield, Mpa | 41.2 | 55.2 | 49.5 | 43.7 | 49.7 | 43.8 | 43.8 | 55.9 | 51.2 | 53.2 | 50.4 | 47.1 | 50.9 | 48.6 | 46.5 | 57.5 |
| Single gated bar vs. double gated bar, 4 mm Delta Tensile Stress at yield, MPa | 14.7 | 1.3 | 1.5 | 6.6 | 2.2 | 1.9 | 14.3 | 0.3 | 1.3 | 0.8 | 1.7 | 3.2 | 2.0 | 2.5 | 2.7 | 0.7 |
| Double gated bar, 4 mm, Flexural Strain at break, % Single gated bar, 4 mm | 1.9 | 5.7 | 6.1 | 2.9 | 5.3 | 5.2 | 3.0 | 7.0 | 7.1 | 7.3 | 7.0 | 5.9 | 5.2 | 5.4 | 5.2 | 5.5 |
| INI at RT, kJ/m$^2$ | 36.0 | 33.8 | 33.6 | 52.6 | 37.4 | 36.1 | 40.0 | 40.5 | 43.1 | 40.8 | 43.8 | 45.7 | 33.6 | 36.2 | 38.2 | 33.6 |
| INI at 0° C., kJ/m$^2$ | 28.9 | 25.7 | 28.2 | 43.2 | 29.7 | 29.8 | 32.0 | 31.7 | 33.9 | 33.3 | 36.6 | 38.3 | 26.6 | 29.9 | 32.0 | 24.5 |
| INI at −30° C., kJ/m$^2$ | 14.5 | 15.0 | 17.2 | 25.2 | 20.6 | 18.6 | 26.0 | 18.4 | 25.7 | 19.8 | 28.9 | 32.2 | 16.1 | 22.2 | 27.2 | 15 |
| Vicat B 120° C./5 kg, ° C. | 128.1 | 117.7 | 118.1 | 135.7 | 115.6 | 113.5 | 132.1 | 128.3 | 127.4 | 129.7 | 127.4 | 124.7 | 120.3 | 117.5 | 114.9 | 122 |

*Controls

As may be seen from the above data, weld line strength, as reflected by properties of the double gated bars, improve when SAN is replaced with PMMA (compare sample 1 with sample 2; sample 4 with sample 5; and sample 7 with sample 8). Surprisingly, it was found that replacing the PMMA with impact-modified PMMA provided a further improvement in double-gated values for Tensile Charpy, Izod (Unnotched), and delta tensile stress (compare, samples 2 with sample 3; and sample 5 with sample 6).

Another improvement was observed when a portion of the polycarbonate resin was replaced with a polycarbonate-polysiloxane copolymer (compare e.g., sample 2 with sample 5; sample 3 with sample 6; and sample 8 with sample 9). This improvement was particularly unexpected, as DE 0206006 discloses that use of a polycarbonate-polysiloxane copolymer result in a decrease in impact and knit line impact strength. Excellent best results are obtained using a combination of impact-modified PMMA and polycarbonate-polysiloxane copolymer.

Particularly good INI (impact notched Izod) values are obtained when a portion of the polycarbonate is replaced with polycarbonate-polysiloxane copolymer.

As used herein, "(meth)acrylate" is inclusive of both acrylates and methacrylates. The singular forms "a," "an," and "the" include plural referents unless the context clearly dictates otherwise. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. The endpoints of all ranges directed to the same property or amount are independently combinable and inclusive of the endpoint. The modifier "about" used in connection with a quantity is inclusive of the stated value, and has the meaning dictated by the context, for example the degree of error associated with measurement of the particular quantity. Where a measurement is followed by the notation "(±10%)", the measurement may vary within the indicated percentage either positively or negatively. This variance may be manifested in the sample as a whole (e.g., a sample that has a uniform width that is within the indicated percentage of the stated value), or by variation(s) within the sample (e.g., a sample having a variable width, all such variations being within the indicated percentage of the stated value). All references are incorporated herein by reference.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition, comprising:
   about 10 to about 84 wt. % of a polycarbonate resin;
   about 0.5 to about 40 wt. % of a polycarbonate-polysiloxane copolymer;
   about 1 to about 40 wt. % of an impact modifier composition wherein the impact modifier comprises an elastomeric phase comprising a butadiene rubber, an isoprene rubber, an ethylene-propylene rubber, an ethylene-propylene-diene monomer rubber, an ethylene-vinyl acetate rubber, a silicone rubber, an elastomeric rubber derived from a $C_{4-9}$ alkyl (meth) acrylate; an elastomeric copolymer of a $C_{1-9}$ alkyl (meth) acrylate with butadiene and/or styrene, or a combination comprising at least one of the foregoing elastomers, together with a rigid copolymer phase derived from the copolymerization of a monomer of formula (13):

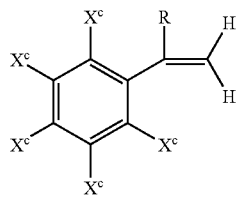
(13)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro, with a monomer of the generic formula (14):

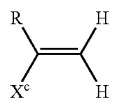
(14)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, or hydroxycarbonyl; and about 1 to about 50 wt. % of an alkyl (meth)acrylate polymer wherein the poly(alkyl(meth)acrylate) comprises impact-modified PMMA; each based on the total combined weight of the thermoplastic composition, exclusive of any filler.

2. The composition of claim 1, comprising about 30 to about 80 wt. % of a polycarbonate resin; about 2 to about 35 wt. % of a polycarbonate-polysiloxane copolymer; about 2.5 to about 35 wt. % of an impact modifier composition; and about 5 to about 35 wt. % of an alkyl (meth)acrylate polymer; each based on the total combined weight of the thermoplastic composition, exclusive of any filler.

3. The composition of claim 1, wherein a sample bar of the thermoplastic composition molded in a double gated mold and having a thickness of 2 mm (±10%) has a tensile Charpy of greater than about 100 kJ/m² measured in accordance with DIN 53448-B.

4. The composition of claim 1, wherein a sample bar of the thermoplastic composition molded in a double gated molded and having a thickness of 2 mm (±10%) has a delta tensile stress at yield of less than about 6 MPa relative to a sample bar of the same composition molded in a single gated mold and having a thickness of 2 mm (±10%), when measured in accordance with ISO 527.

5. The composition of claim 1, wherein a sample bar of the thermoplastic composition molded in a double gated mold and having a thickness of 2 mm (±10%) has a tensile elongation at break of greater than about 2.5% measured in accordance with ISO 527 at room temperature.

6. The composition of claim 1, wherein a sample bar of the thermoplastic composition molded in a double gated mold and having a thickness of 4 mm (±10%) has an Unnotched Izod Impact of greater than about 7 kJ/m² measured in accordance with ISO 180/1A.

7. The composition of claim 1, wherein a sample bar of the thermoplastic composition molded in a double gated mold and having a thickness of 2 mm (±10%) has a tensile elongation at break of greater than about 2.5% measured on a 2 mm (10%) bar molded in a double-gated mold in accordance with ISO 527 at room temperature.

8. The composition of claim 1, wherein a sample bar of the thermoplastic composition molded in a single gated mold and having a thickness of 4 mm (±10%) has a Notched Izod Impact of greater than about 20 kJ/m², measured at 0° C. in accordance with ISO 180/1A.

9. The composition of claim 1, wherein a sample bar of the thermoplastic composition molded in a single gated mold and having a thickness of 4 mm (±10%) has Notched Izod Impact of greater than about 15 kJ/m², measured at −30° C. in accordance with ISO 180/1A.

10. The composition of claim 1, wherein the polysiloxane-polycarbonate copolymer comprises:
aromatic carbonate units of formula (1):

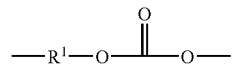
(1)

wherein at least about 60 percent of the total number of $R^1$ groups are aromatic organic radicals and the balance thereof are aliphatic, alicyclic, or aromatic radicals; and
polydiorganosiloxane units of formula (7)

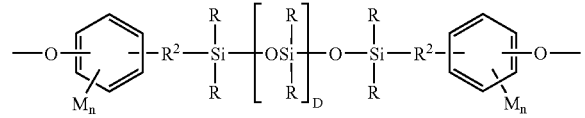
(7)

wherein
each R is independently a $C_{1-13}$ monovalent organic radical;
D has an average value of 2 to about 1000,
each $R^2$ is independently a divalent $C_2$-$C_8$ aliphatic group;
each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy; and
each n is independently 0, 1, 2, 3, or 4.

11. The composition of claim 10, wherein D is about 40 to about 70.

12. The composition of claim 10, wherein $R^1$ is a divalent radical of formula (2):

$$-A^1-Y^1-A^2- \quad (2)$$

wherein each of $A^1$ and $A^2$ is a monocyclic divalent aryl radical and $Y^1$ is a bridging radical having one or two atoms that separates $A^1$ from $A^2$; each R is independently a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{10}$ aryl, $C_6$-$C_{10}$ aryloxy, $C_7$-$C_{13}$ aralkyl, $C_7$-$C_{13}$ aralkoxy, $C_7$-$C_{13}$ alkaryl, or a $C_7$-$C_{13}$ alkaryloxy, each $R^2$ is independently a $C_1$-$C_3$ alkylene, each M is independently, and each n is 1.

13. The composition of claim 12, wherein each $Y^1$ is independently —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, or adamantylidene; each R is independently a $C_{1-8}$ alkyl, trifluoropropyl, $C_{1-8}$ cyanoalkyl, phenyl, chlorophenyl, or tolyl group; each M is a methyl, ethyl, propyl, methoxy, ethoxy, propoxy, phenyl, chlorophenyl, or tolyl group; $R^2$ is a trimethylene group; and R is a $C_{1-8}$ alkyl, trifluoropropyl, $C_{1-8}$ cyanoalkyl, phenyl, chlorophenyl, or tolyl.

14. The composition of claim 12, wherein $A^1$ and $A^2$ are each a divalent phenyl group; $Y^1$ is methylene, cyclohexylidene, or isopropylidene; M is methoxy; and R is methyl, or a mixture of methyl and trifluoropropyl, or a mixture of methyl and phenyl.

15. The composition of claim 1, wherein the elastomer phase comprises polybutadiene and the rigid copolymer phase comprises units derived from the copolymerization of styrene, alpha-methyl styrene, dibromostyrene, vinyltoluene, vinylxylene, butylstyrene, para-hydroxystyrene, methoxystyrene, or a combination comprising at least one of the foregoing styrenes with acrylonitrile, ethacrylonitrile, methacrylonitrile, alpha-chioroacrylonitrile, beta-chioroacrylonitrile, aipha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, or a combination comprising at least one of the foregoing co-monomers.

16. The composition of claim 1 wherein the impact modifier is ABS, AES, MABS, ASA, or a combination comprising at least one of the foregoing impact modifiers.

17. The composition of claim 1, wherein the impact-modified poly(alkyl (meth)acrylate) has a notched Izod of greater than about 20 J/m measured in accordance with ASTM D-256 at room temperature.

18. The composition of claim 1, further comprising an additive selected from the group consisting of: a filler, a reinforcing agent, a pigment, or a combination comprising at least one of the foregoing additives.

19. The composition of claim 18 wherein the additive is treated by coating and/or chemical passivation.

20. An article comprising the composition of claim 1.

21. A method for forming an article, comprising:
molding, extruding or shaping the composition of claim 1 to form the article.

* * * * *